No. 841,363. PATENTED JAN. 15, 1907.
A. R. & F. S. WELCH.
UNIVERSAL JOINT.
APPLICATION FILED NOV. 4, 1905.
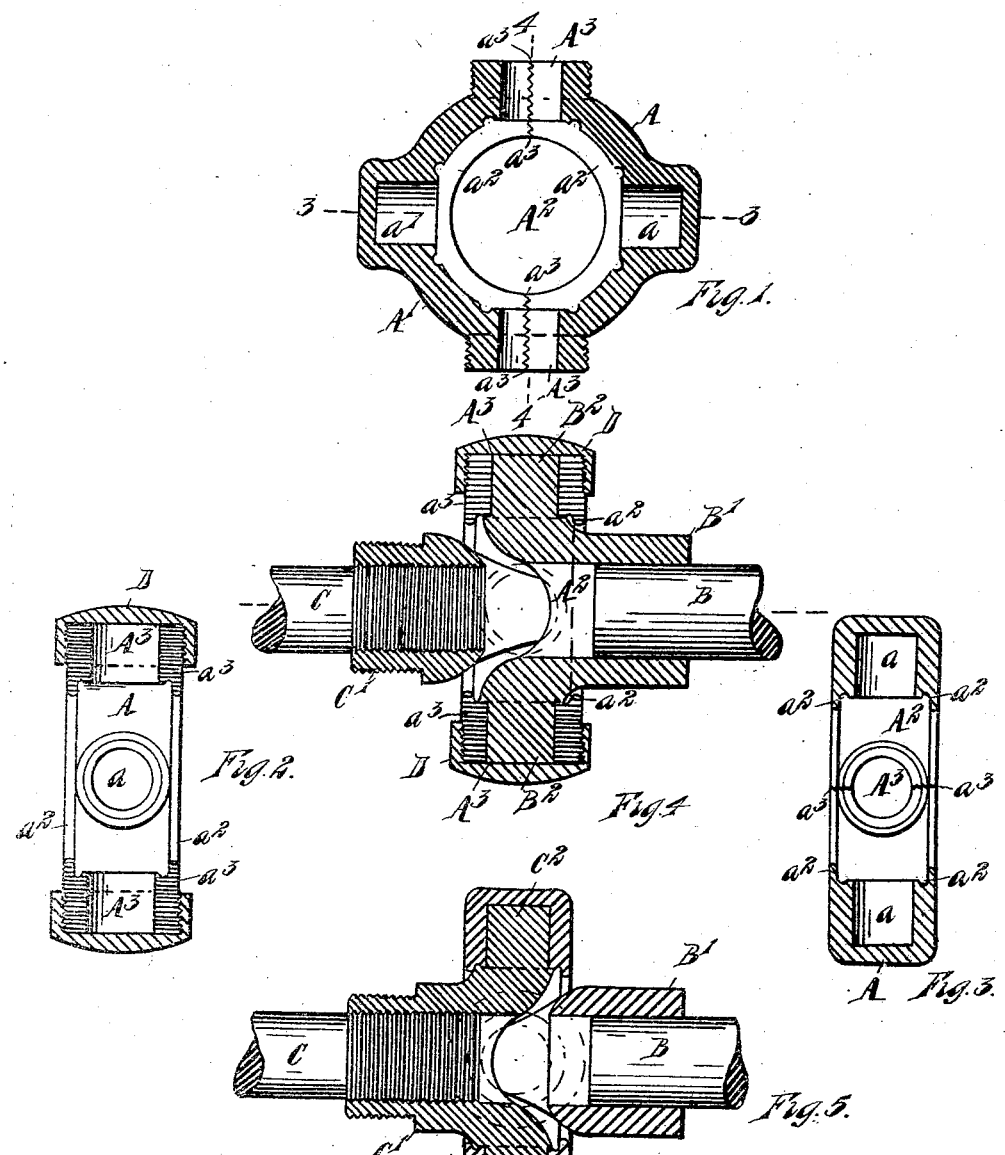
WITNESSES
C. E. Day
C. C. Jennings
INVENTORS
Allie Ray Welch
Fred Stenson Welch
By Parker & Burton
Attorneys.

UNITED STATES PATENT OFFICE.

ALLIE R. WELCH AND FRED STIMSON WELCH, OF PONTIAC, MICHIGAN.

UNIVERSAL JOINT.

No. 841,363.   Specification of Letters Patent.   Patented Jan. 15, 1907.

Application filed November 4, 1905. Serial No. 285,877.

*To all whom it may concern:*

Be it known that we, ALLIE R. WELCH and FRED STIMSON WELCH, citizens of the United States, residing at Pontiac, county of Oakland, State of Michigan, have invented a certain new and useful Improvement in Universal Joints; and we declare the following to be a full, clear, and exact description of the invention, such as will enable others skilled in the art to which it pertains to make and use the same, reference being had to the accompanying drawings, which form a part of this specification.

Our invention relates to universal joints; and the object of our improvements is to provide a universal joint of improved construction that may be easily taken apart and adjusted to place.

In the accompanying drawings, Figure 1 is a central cross-section of the frame or casing of a universal joint embodying our invention, the securing-caps being removed. Fig. 2 is an elevation of one-half of the frame, the portion being shown that comes against the corresponding portion of the other part of the frame. The securing-caps are here shown in their proper position. Fig. 3 is a cross-section of the frame, taken on the line 3 3, Fig. 1. Fig. 4 is a sectional elevation of the assembled joints, the section being taken in the plane 4 4, Fig. 1. Fig. 5 is a similar view to Fig. 4, the section being taken in the plane indicated by the line 3 3, Fig. 1.

A A' are the two parts of the frame of the joint. These two parts are separable on the line 4 4, Fig. 1, in a plane through the axis of one of the bearings hereinafter referred to through the axis of the frame.

The contiguous surfaces are indented, as shown, so as to fit into each other and prevent relative motion along the average line of separation. In the construction shown the contiguous surfaces are cut across laterally, forming grooves V-shaped in cross-section, as this is an effective construction that may be easily made.

B and C are the shafts which are to be united by the joint. B' and C' are caps or ends secured upon said shafts and provided, respectively, with trunnions $B^2$ and $C^2$.

$a$ $a'$ are radial bearings in the frame A A' for receiving the trunnions $C^2$ $C^2$.

$A^3$ $A^3$ are radail bearings in the frame A A', extending at right angles to the bearings $a$ $a'$. Half of each of the bearings $A^3$ is in one of the parts of the frame and the other half in the other part, the walls of the said bearings being separated and provided with intermeshing teeth $a^3$ on their contiguous surfaces, which teeth lock the two parts of the frame together in one direction. At the outer ends the walls of the bearings $A^3$ project radially from the frame A A'. The outer ends of the walls of the bearings $A^3$ $A^3$ are circular at their outer surfaces and provided with screw-threads, upon which are screwed screw-caps D D, Figs. 2 and 4, which bind the two parts of the frame firmly together.

The construction of the parts A A' of the frame is such as to leave a circular opening $A^2$ concentric with said frame. The walls bounding said opening extend inward at each end, forming annular projecting walls or flanges $a^2$ $a^2$.

It will be seen that the above-described joint may be readily assembled, it being only necessary to put the two parts A A' together with the trunnions of the shafts in their respective bearings and then to screw the caps D D in place, the indentations $a^3$ and the caps D D holding the parts strongly and rigidly in position. The facility of taking the joint apart will be obvious.

The joint is oiled by placing a little oil upon the walls surrounding the opening $A^2$, the centrifugal force causing the oil to run to the bearings. The annular projections $a^2$ $a^2$ prevent the oil from running out. The caps D D being integral and forming cups opening inward avoid any joint through which the oil could escape, and the ends of the bearings $a$ $a'$ are also without joint.

While we prefer the form of indentations $a^3$ having sloping sides, it is obvious that other forms that would prevent relative motion of the two parts might be substituted for that shown.

What we claim is—

1. In a universal joint, a frame provided with bearings for the trunnions of the shafts, said frame being divided in a plane through the axis of one of said bearings and approximately parallel to the axis of said frame, the contiguous surfaces of the parts of said frame being provided with transverse interlocking ridges, and means for preventing the relative transverse movement of said surfaces and for holding the parts of the frame together.

2. In a universal joint, a frame provided with bearings for the trunnions of the shafts, one of said bearings having a cylindrical exteriorly-screw-threaded wall, said frame being divided in a plane through the axis of said bearing, the contiguous surfaces being formed to interlock, and a screw-cap having its threads engaging the screw-threads on the wall of said bearing.

3. In a universal joint, a frame provided with bearings for the trunnions of the shafts, one of said bearings having a cylindrical exteriorly-screw-threaded wall, said frame being divided in a plane through the axis of said bearing, the contiguous surfaces being provided with interlocking transverse grooves, and a screw-cap having its threads engaging the screw-threads on the wall of said bearing.

4. In a universal joint, a frame provided with bearings for the trunnions of the shafts, one of said bearings having a cylindrical exteriorly-screw-threaded wall, said frame being divided in a plane through the axis of said bearing, and a screw-cap having its threads engaging the screw-threads on the wall of said bearing.

5. In a universal joint, a frame open within its periphery and provided with bearings extending from the central opening, said frame being divided in a plane through the axis of a bearing, said bearing having outwardly-extending cylindrical walls screw-threaded exteriorly, the contiguous surfaces being adapted to interlock, and a screw-cap upon said cylindrical walls engaging the threads thereof, having its outer end closed and its inner end open, for the purpose described.

6. In a universal joint, a frame provided with a radially-extending two-part bearing, and a cap having its outer end closed, covering the outer end of said bearing and acting to hold the same together.

7. In a universal joint, a frame open within its periphery and provided with bearings extending from the central opening, said frame being divided in a plane through the axis of a bearing, said bearing having outwardly-extending cylindrical walls screw-threaded exteriorly, the contiguous surfaces being adapted to interlock, and a screw-cap upon said cylindrical walls engaging the thread thereof, having its outer end closed and its inner end open, there being inwardly-extending flanges at the ends of said opening, for the purpose described.

In testimony whereof we sign this specification in the presence of two witnesses.

ALLIE R. WELCH.
FRED STIMSON WELCH.

Witnesses:
F. S. MILWARD,
FLORA McLEAN.